United States Patent Office 3,544,333
Patented Dec. 1, 1970

3,544,333
MACARONI PRODUCTS MADE WITH NONFAT MILK SOLIDS
Elmer F. Glabe, Chicago, Perry W. Anderson, Niles, and Gerald M. Murawski, Chicago, Ill., assignors to Marine Colloids, Inc., Springfield, N.J., a corporation of Delaware
No Drawing. Continuation of application Ser. No. 696,998, Jan. 11, 1968, which is a continuation-in-part of application Ser. No. 437,294, Mar. 4, 1965. This application Jan. 29, 1969, Ser. No. 800,334
Int. Cl. A23l 1/16
U.S. Cl. 99—85
5 Claims

ABSTRACT OF THE DISCLOSURE

Macaroni products containing 1% to 30% by weight nonfat milk solids and Iota type carrageenan in an amount sufficient to improve texture, stability and cooking stability of said products are prepared.

---

This application is a continuation of U.S. application Ser. No. 696,998 filed Jan. 11, 1968, which in turn is a continuation-in-part of U.S. application Ser. No. 437,294 filed Mar. 4, 1965 both now abandoned.

This invention relates to a new and improved product which is herein referred to as an improved nonfat milk macaroni product.

The name "macaroni product" has a well defined meaning as defined in the definitions and standards of identity for macaroni and noodle products promulgated under the United States Federal Food, Drug and Cosmetic Act and published in Part 16, Chapter I, Title 21 of the Code of Federal Regulations (see the Federal Register Oct. 13, 1964).

Macaroni products are the class of food, each of which is prepared by drying formed units of dough made from semolina, durum flour, farina, flour or any combination of two or more of these with water and with or without one or more optional ingredients. Macaroni is the macaroni product the units of which are tube-shaped and more than 0.11 inch and less that 0.027 inch in diameter. Spaghetti is the macaroni product the units of which are tube-shaped or cord-shaped (not tubular) and more than 0.06 inch but not more than 0.11 inch in diameter. Vermicelli is the macaroni product the units of which are cord-shaped (not tubular) and not more than 0.06 inch in diameter.

Milk macaroni products as defined in the aforesaid definitions and standards of identity contain not less than 3.8% milk solids by weight of the finished milk macaroni product. The milk ingredients must be concentrated milk, evaporated milk, dried milk, or a mixture of butter with skim milk (dried skim milk), or any two or more of these, in such proportions that the weight of nonfat milk solids in such mixture is not more than 2.275 times the weight of milk fat therein. This requires the use of at least 1.67% by weight milk fat to meet the standard of identity.

The process for making macaroni products is the same regardless of the eventual shape of the finished piece. This is determined by the type of die through which the dough is extruded. The original process for making macaroni as used by all of the manufacturers in the industry consists of feeding durum semolina and/or flours into a standard macaroni mixer. This is a "continuous" type mixer. Water is metered into the same end of the mixer at which the flour is admitted. The amount is generally between 30% to 35% based on the weight of semolina. The mixer combines the water and semolina into a loose dough. The characteristic of this dough is very dry and crumbly. It is completely dissimilar from a bread dough because if durum semolina is used exclusively, the dough retains a short characteristic rather than a stretchable characteristic which is typical of bread dough made from ordinary hard wheat flour. If ordinary hard wheat flour is employed in making macaroni the formation of a "stretchable" dough must be avoided since formation of this type would give extreme difficulty in the later stages of the manufacturing process, particularly in the extrusion stage.

The loose dough described above is conducted to an adjacent, but frequently contiguous piece of machinery known as the press. In this area, and in some mixers throughout all but the first stages of the mixing, the dough is mechanically manipulated under a vacuum of 21" to 27" of mercury. The vacuum-mixing in this chamber serves to draw out all collections of air or other gases which might be mechanically entrapped in the dough. These small bubbles give rise to macaroni products with uneven surfaces and can cause some cracking or breaking of the finished dried product. Another reason for the vacuum-mixing is to prevent the oxidase enzymes in the flour (durum or ordinary hard wheat) from oxidizing the natural carotin, or yellow pigment of the wheat, into a colorless substance. The process is upset if the enzyme has no oxygen which which to complete the reaction. The macaroni industry strives to make product with as much natural yellow color as is possible. White macaroni products are less desirable than those having a yellow or creamy color after having been prepared for table use.

The dough as it leaves the vacuum area is forced by mechanical means through a die which determines the shape of the end product. There are many well known shapes, all of which are brought about by the particular construction of the aperture in the die. Changes in shapes are brought about by locating retarding points in the apertures which cause the extruding dough to turn and assume the shape of an elbow macaroni, or to assume the shape of sea-shells as in "shell macaroni" and others.

Upon coming from the die the product is cut by means of automatically operating knife blades. In the case of "spaghetti" the dough is extruded as long thin rods, approximately 50" to 60" in length. These rods are then folded in half and automatically hung over rods or "sticks." Each rod of spaghetti dough lies adjacent to other rods and must not lie on top of another rod.

In the case of "short goods" which is macaroni, elbow macaroni, shell macaroni, and other short pieces, the cutting mechanism cuts the dough by means of travelling across the surface of the die. The speed of the blade determines the length of the piece.

Commonly, these pieces are then dropped into an air conveying system which conducts the pieces to a hopper. From here the pieces are spread by a mechanical spreader on trays or on continuous belts, both of which then go into the drying chambers. In the case of short goods, the depth of the macaroni pieces is sometimes several inches.

During the drying operation these beds are agitated or completely turned over to permit uniform drying.

In the case of spaghetti or "long goods" the product suspended on the rods or sticks, is mechanically conveyed to the drying chambers.

The drying of macaroni products requires considerable technical skill and knowledge of both the mechanical operation of the drying chambers as well as a knowledge of the transfer of water from the dough to the atmosphere, and a knowledge of the chemistry involving the proteins and the starch of the particular wheat endosperm materials which were used in making the macaroni products. The way that the macaroni products are dried will determine to a large extent the quality of the finished dried product. Even if the highest quality durum semolina is used and the dough is properly formed, if the drying operation is improperly carried out, the resulting macaroni products may be "checked." This is the industry term applied to products which display tiny cracks in the dried macaroni. These cracks are visible to the naked eye on careful inspection and are very easily visible with the use of a low power microscope. "Checked" macaroni products generally do not display the characteristic cracks until the dried product is several days old. From this point on the cracks become more visible as the product is held under storage. The cracking develops even though further evaporation of moisture from the dried product is prevented by enclosing the macaroni products in moisture-proof packing materials or even closed metal containers. The development of these cracks or checks is a chemical process related to moisture transfer from starch to protein or the reverse. The exact details of the chemical reactions in checking are not thoroughly understood or completely explored. The industry does know how to prevent checking in most cases of drying macaroni products. However, checking still occurs in a relatively large number of cases in day to day production, resulting in the manufacturer having to bring back product which is out on the grocers' shelves. Checked macaroni products break into small pieces when cooked.

At the present time, the drying of macaroni products requires approximately 24 to 36 hours or even longer. Efforts are now being made to reduce the drying time.

There are three distinct stages in the drying of macaroni products. The first stage is known as the "Preliminary Drying." In this step drying is carried out at approximately 85° F. dry bulb and approximately 80° F. wet bulb. The macaroni products are kept under these conditions for about 30 minutes. During this stage, the surface moisture is removed rather rapidly. Normally this makes for a condition of water transfer from the interior of the macaroni piece to the outer surface. If the macaroni is allowed to remain under the conditions in the preliminary drier too long, the outer surface will become drier than the interior of the macaroni piece. The water in the interior, attempting to find its way out, will cause the characteristic cracks or fissures attendant to checking.

In order to prevent this the macaroni products are removed from the preliminary drier and go into a "sweating period." In this section of the drying operation a typical condition will be 83° F. wet bulb. These conditions allow transfer of the interior moisture to the surface to get well under way without the development of a dried outer surface. The macaroni products commonly remain under these conditions for about one hour.

A final or finish drying is carried out in the third stage. At the time the macaroni products enter the drier, the dry bulb will be 95° F. and the wet bulb about 91° F. During the subsequent hours in the drier the conditions are gradually changed by raising the dry bulb temperature, in a typical instance, to 102° F. and reducing and holding the wet bulb readings to 90° F. The macaroni products are in this drier for another 26 to 40 hours.

Upon coming from the driers the finished product in the case of spaghetti, is cut to the desired lengths. These lengths are then weighed and packaged as commercial spaghetti.

Short goods types of macaroni products are weighed and packaged. Type of packaging materials used are those which prevent moisture change in the finished product.

The moisture content of the finished product is in the neighborhood of 12%. Different cuts of macaroni products will have different equilibrium-moisture values. The method of handling the product during mixing and drying, and the type of raw materials used, will also influence the equilibrium-moisture values.

The character of macaroni products is not resident in any one particular characteristic. Instead, it is a combination of a number of characteristics, all of which blend into making the product superior, mediocre, or poor in the mind of the person eating the product. Typical chemical analyses are, therefore, of little value. The amount of water which the macaroni absorbs during the cooking operation is of some value as a measure of its quality, however, a full evaluation of the quality of macaroni products can only be made by taking all factors into consideration.

It was for this purpose that the Cooking Test Profile Method was developed some years ago. It has been found to be eminently successful in evaluating macaroni products. Although it is a subjective test, a trained panel has no difficulty in producing the same results on the same products when they are examined under numbers, the code of which is unknown to the judges. The method of making the Cooking Test Profile is as follows:

All samples to be tested are given code numbers.

A 50 gram sample of the macaroni to be tested is used for the Cooking Test Profile. If spaghetti is to be tested, the strands are first cut into uniform 4 inch lengths.

One liter of distilled water (no salt added) is brought to a boil. The macaroni is added. "Cooking time" is started when the water returns to a boil. The heat is adjusted to obtain a slow, rolling boil. The macaroni is stirred occasionally to prevent sticking.

After boiling 10–12 minutes, the macaroni is tested for "doness." This is determined by either chewing in the mouth, or in the case of spaghetti, by the glass plate method. This method consists of pressing a strand of spaghetti between two glass plates and observing for the presence of an uncooked core. Strands of spaghetti are removed from the cooking water periodically and tested by this glass plate method until the uncooked core just disappears. The elapsed time between the time the water returned to boil after adding the spaghetti, to the time the uncooked core just disappears is the "Cooking Time" of the spaghetti. This is designated as time "T."

One minute after the cooking time ($T+1$), samples of the cooked macaroni are removed with a fork and given on white plates to an experienced panel of judges for evaluation.

The macaroni in the pan is allowed to continue boiling and after an additional 5 minutes ($T+6$), another set of samples is removed for the judges' evaluation.

Cooking of the macaroni is continued for another 5 minutes ($T+11$), after which the final set of cooked macaroni samples is removed for evaluation by the judges.

The panel of judges evaluates each sample of macaroni (spaghetti) for each of the characteristics shown on the Cooking Test Profile Report at each Cooking Time period ($T+1$, $T+5$, $T+11$). Demerits are assigned for each characteristic showing "less than standard" in the expert opinion of the panel judge. Each judge thereby evaluates each sample of macaroni (spaghetti) for each characteristic at three different cooking periods.

The scores arrived at by all the judges on the panel are "averaged" at the end of the test series. These values are set down on the report. The total demerits are subtracted from 100 (perfect score) to give a "total score value" at each cooking period ($T+1$, $T+5$, etc.) for quick comparison. This is the "Cooking Profile" of the sample.

A change in value of two or more points in each characteristic and in total score is a significant change.

Macaroni products which show the least change in any and all characteristics throughout these three tests at the three cooking times have the highest quality.

At the end of the cooking period, the cooking water is observed for cloudiness and leaching out of the color from the macaroni. Periodically during cooking, the odor of the cooking water is noted. This is of particular importance for noodles where poor grade eggs can produce off-odors. Usually 2, 3 or 4 Profile Tests are made simultaneously in order to obtain a direct comparison between different macaroni samples.

Although provision has been made in the Federal Standards for milk macaroni no product of this kind exists on the commercial United States market today.

One difficulty attendant to the manufacture of milk macaroni is that introduction of even the required very small amount of fat (in this instance butterfat) causes the macaroni dough to become very flaccid and soft. It assumes the characteristics of a viscous liquid rather than a flowable solid. The dough containing butterfat or any fat, flows easily. If this dough is extruded as spaghetti, the long rods of dough upon being suspended from the usual drier-rods or sticks, continue to flow or in the terminology of the industry, they sag. The result of this is spaghetti rods which are very uneven in appearance being thinner in some places than in others; this in turn makes for uneven cooking and further accentuates the softening of the product during the cooking step for preparation of the product for table use. In short, the presence of the required amount of butterfat or fat of any kind, results in a product which is unsaleable. The quantity of fat which produces this sagging character is relatively small. Since the Federal Standard of Identity for milk macaroni requires the presence of butterfat in relation to the quantity of nonfat milk solids used, the amount of fat becomes substantial and produces the difficulties indicated.

Another difficulty is that the butterfat in the finished milk macaroni becomes rancid giving the finished product a very disagreeable taste and making it unsaleable. The rancidity of the butterfat is very likely brought about by the long drying period (40 hours) at relatively high temperatures for butterfat stability (100° F.).

It has been found that macaroni products containing up to and including 30% by weight nonfat milk solids can be prepared with excellent texture and eating qualities provided the amount of fat is zero or is kept at a minimum below that presently specified in the standards of identity previously described and in any case below 0.5% by weight fat. However, as the quantity of nonfat milk solids is increased into the range of 10% to 15% by weight the tendency of spaghetti containing such proportions of nonfat milk solids to sag becomes more pronounced. In other words, there is a significant loss of elasticity. When such macaroni products are cooked they are also softer and tend to lose their original shapes.

The texture and eating qualities of macaroni products are of greatest importance of all of the charatceristics indicated on the Cooking Test Profile. The macaroni industry has always striven for a product with improved texture and one in which the texture does not become soft when the cooked product is allowed to stand as on a steam table in a restaurant, or when the product, as in the case of elbow macaroni, is used in a salad-type dish in combination with fish or other meat products. Spaghetti and macaroni have always been highly susceptible to the softening process brought about by either slightly overcooking or by standing after having been cooked. This softening process becomes even more aggravating if the spaghetti is used for canning purposes. In this process the spaghetti is first cooked, then placed in the can, frequently with other ingredients, and then the can is cooked again at high temperatures in order to effect sterilization. When the user prepares such a can of spaghetti for the table, it is cooked a third time. Most spaghetti and macaroni products show extreme softening under these conditions.

The same is true for product which is prepared in the home. Often over-cooking is the result of either inattention by the person preparing the product, but more frequently the product is soft because of the narrow range of tolerance to cooking.

It would be desirable to provide a nonfat milk macaroni product of the type described which has greater elasticity and retains its shape during manufacture and afterward during cooking. It would also be desirable to provide a nonfat milk macaroni product containing higher proportions of nonfat milk solids and characterized by texture stability, palatability and cooking stability.

In accordance with this invention it has been found that these objectives can be accomplished by adding to a nonfat milk macaroni product of the type previously described a fraction of a percent by weight, preferably 0.01% to 0.20% by weight, of Iota type carrageenan, preferably of the type represented by that extracted from *Eucheuma spinosum*. The addition is made during the preparation of the dough and the percentage of carrageenan is calculated on the weight of solids. For example, a nonfat milk macaroni can be prepared by mixing in the dough stage 15 parts by weight nonfat dry milk, 84.8 parts by weight semolina and 0.2 part by weight of the carrageenan extract. The quantity of nonfat dry milk can be increased to 30% by weight of the total solids. A preferred range is 10% to 25%.

While the invention is not limited to any theory it is believed that the carrageenan complexes the milk protein with the flour protein thereby causing the product to retain a more elastic texture during manufacture and later when the final product is cooked. The final product has better elasticity when cooked under proper conditions and can be cooked longer without disintegrating or becoming mushy than would be possible without the addition of the carrageenan extract.

The carrageenan is preferably of a special type which is a calcium sensitive carrageenan extract as represented by that extracted from *Eucheuma spinosum*. Apparently, this type of carrageenan product has the ability to swell in cold water so that the final result appears to be a solution. However, the solution is more like a colloidal solution. True solution is not obtained until heat is applied. After cold swelling has occurred, the carrageenan product has the ability to react with proteins.

The marine plane *Eucheuma spinosum* produces a type of carrageenan designated as Iota. This same type of carrageenan can be obtained from other sources and these can be employed in the practice of the invention.

The invention was evaluated by comparative tests of standard spaghetti versus spaghetti made with different percentages of nonfat dry milk without any butterfat added. The invention was also evaluated by comparative tests of standard macaroni versus macaroni made with different percentages of nonfat dry milk without any butterfat added.

In the spaghetti tests the condition of the spaghetti after extruding and after drying was observed. Slackness after extruding is very undesirable because it gives a nonuniform product. The macaroni was also examined and compared in the dry state. A highly checked product will tend to be mushy on cooking. Cooking test profiles were made on all products.

The experiments which were made to demonstrate the basic features of the invention of nonfat milk macaroni were on both a pilot macaroni plant and on commercial macaroni plant equipment. The pilot plant experiments were made on six to eight pound batches. The equipment consisted of a small mixer equipped with varuum. The press and die were of smaller size, but commercially similar design.

The commercial plant experiments were made with typical industry equipment and were made using 1500 pound batches of product. Both elbow macaroni and standard size spaghetti extrusions were made. All of the products were evaluated according to the Cooking Test Profile and a dry product evaluation.

All of the data in these experiments were assembled into tables. On these tables the Cooking Test Profile data have been condensed to indicate the two major characteristics of the macaroni products, taste and texture. Similarly, the dry product evaluation has been condensed to the surface appearance color and whether the product is checked or not.

In making the Cooking Test Profile evaluations, the spaghetti and macaroni products were tested five days after they came from the drier. It has been found that there is a gradual change in the product from the time it is taken from the drier through the next 48 hours. By five days, the product is then stable and can then be evaluated.

The same is relatively true of the dry product evaluation. Checking is not always evident in the first day or two. Sometimes it does not show up for several weeks. Therefore, an evaluation was made immediately after coming from the drier (one day) and again two weeks thereafter.

In the experiments shown in the tables the proportions are by weight unless otherwise indicated.

TABLE I.—SPAGHETTI EXPERIMENTS

| Experiment | 1 | 2 | 3 | 4 | 5 |
|---|---|---|---|---|---|
| Semolina, percent | 100 | 100 | 98.0 | 95.00 | 92.50 |
| Eucheuma spinosum | | | 0.10 | | |
| Nonfat dry milk added | | | 2.0 | 5.0 | 7.50 |
| Dough water added.[1] | 28.00 | 26.00 | 28.00 | 28.00 | 26.00 |
| Condition of spaghetti after extruding. | Firm; normal | Very firm; stiff | Firm; normal | Firm; normal | Firm; normal. |
| Condition of dry spaghetti 1 day after finish drying.[2] | Normal | Slightly uneven surface; brittle. | Normal | Uneven surface; white crust. | Uneven surface; white crust. |
| Condition of dry spaghetti 2 weeks after drying.[2] | do | Normal | do | Uneven surface; not checked. | Uneven surface; not checked. |
| Condition of cooked spaghetti (5 days) after drying.[3] | Normal texture; normal taste. | Normal texture; normal taste. | Soft texture; normal taste. | Texture slightly firmer than No. 2; taste better than No. 2. | Texture slightly firmer than No. 4; taste slightly better than No. 4. |

[1] Quantity of water expressed as pounds per 100 lbs. of semolina or semolina and dry milk.
[2] Preliminary Drier 95° F. Dry Bulb 90° F. Wet Bulb 83% R.H. 0.5 hr. Sweat Period 95° F. Dry Bulb 93° F. Wet Bulb 92% R.H. 1.0 hr. Finish Drier 95°–102° F. Dry Bulb 91°–90° F. Wet Bulb 85%–64% R.H. 40 hrs. (Preliminary Drier Nos. 3, 4 and 5 were 85° F. Wet Bulb 67% R.H.; final drying 42 hrs.)
[3] Summary of salient differences determined by Cooking Test Profile.

TABLE II.—SPAGHETTI EXPERIMENTS

| Experiment | 6 | 7 | 8 | 9 | 10 |
|---|---|---|---|---|---|
| Semolina, percent | 90.0 | 85.00 | 92.4 | 84.9 | 79.9 |
| Eucheuma spinosum | | | 0.10 | 0.10 | 0.10 |
| Nonfat dry milk added | 10.0 | 15.0 | 10.0 | 15 | 20.0 |
| Dough water added.[1] | 26.00 | 26.00 | 26.00 | 26.00 | 26.00 |
| Condition of spaghetti after extruding. | Slack; sags | Very slack; sags | Firm; normal | Firm; normal; no sag. | Firm; normal; no sag. |
| Condition of dry spaghetti 1 day after finish drying.[2] | Uneven surface; white crust. | Uneven surface; white crust. | Normal | Normal | Slightly uneven; slight white crust. |
| Condition of dry spaghetti 2 weeks after finish drying.[2] | Uneven surface; white crust; not checked; slightly brittle. | Uneven surface; checked; brittle. | do | do | Slightly uneven surface; slight white crust. |
| Condition of cooked spaghetti (5 days) after drying.[3] | Equal to No. 4; better than No. 5. | Softer texture than No. 4; taste equal to No. 2; better than No. 5. | Firmer than No. 1, 6, and 7; taste better than No. 1, 6 and 7. | Texture firmer than No. 8; taste better than No. 8 and 7. | Texture better than No. 1, 5, 6, 7; taste equal to No. 9. |

[1] Quantity of water expressed as pounds per 100 lbs. of semolina and dry milk.
[2] Preliminary Drier 95° F. Dry Bulb 85° F. Wet Bulb 67% R.H. 0.5 hr. Sweat Period 95° F. Dry Bulb 93° F. Wet Bulb 92% R.H. 1.0 hr. Finish Drier 95°–102° F. Dry Bulb 91°–90° F. Wet Bulb 85%–64% R.H. 42 hrs.
[3] Summary of salient differences determined by Cooking Test Profile.

TABLE III.—SPAGHETTI EXPERIMENTS

| Experiment | 11 | 12 | 13 |
|---|---|---|---|
| Seminola, percent | 69.9 | 79.8 | 69.8. |
| Nonfat dry milk | 30.0 | 20.0 | 30.0. |
| Eucheuma spinosum | 0.10 | 0.20 | 0.20. |
| Dough water added [1] | 25. | 26.0 | 25.0. |
| Condition of spaghetti after extruding | Slightly slack | Firm; normal | Firm; normal. |
| Condition of dry spaghetti 1 day after finish drying.[2] | Uneven surface; white crust | Normal | Slightly uneven surface; white crust not checked. |
| Dry spaghetti after 2 weeks [2] | Uneven surface; checked | do | Slightly uneven surface; white crust not checked. |
| Condition of cooked spaghetti (5 days) after drying.[3] | Texture slightly firmer than #1 taste equal to #9. | Texture firmer than #10; taste equal to #9. | Firm texture; better than #11 but not as good as #12; taste equal to #9. |

[1] Quantity of water expressed as pounds per 100 lbs. semolina and dry milk.
[2] Preliminary Drier 95° F. Dry Bulb 85° F. Wet Bulb 67% R.H. 0.5 hr. Sweat Period 95° F. Dry Bulb 93° F. Wet Bulb 92% R.H. 1.0 hr. Finish Drier 95° F.–102° F. Dry Bulb 91° F. Wet Bulb 85%–64% R.H. 42 hrs.
[3] Summary of salient differences determined by Cooking Test Profile.

TABLE IV(a)

The dry product evaluation of Example 1, Table I (standard macaroni) was as follows:

|  | Range of demerits | Demerits |
|---|---|---|
| Serious flaws: |  |  |
| Checked | 0–20 | 0 |
| Split | 0–10 | 0 |
| Deformed | 0–10 | 0 |
| Color: |  |  |
| Gray or brown (10=very dark) | 0–10 | 0 |
| Yellow (5=no yellow) | 0–5 | 2 |
| Appearance: |  |  |
| Large bubbles (poor predrying) | 0–5 | 0 |
| Small bubbles (poor vacuum) | 0–5 | 0 |
| White specks | 0–5 | 1 |
| Dark specks | 0–5 | 1 |
| Rings | 0–5 | 0 |
| Streaks | 0–10 | 0 |
| Roughness | 0–10 | 0 |
| Total demerits | 0–100 | 4 |
| Score (100-demerits) |  | 96 |

TABLE IV(b)

The product evaluation of Example 1, Table I (Standard macaroni) after cooking times of ten minutes, fifteen minutes and twenty minutes was as follows:

|  | Range of demerits | Cooking time, minutes | | |
|---|---|---|---|---|
|  |  | 10 | 15 | 20 |
| Gray or brown color (5—very dark) | 0–5 | 0 | 0 | 0 |
| Yellow color (5—no yellow) | 0–5 | 2 | 2 | 3 |
| Surface irregularity | 0–5 | 0 | 0 | 1 |
| Splitting or breaking | 0–10 | 0 | 0 | 1 |
| Stickiness | 0–10 | 1 | 2 | 2 |
| Slime | 0–10 | 2 | 4 | 5 |
| Odor | 0–10 | 1 | 1 | 1 |
| Taste | 0–10 | 1 | 3 | 3 |
| Too soft | 0–10 | 2 | 4 | 5 |
| Too firm | 0–5 | 0 | 0 | 0 |
| Sticks to teeth | 0–10 | 0 | 1 | 1 |
| Doughiness or lack of elasticity | 0–10 | 1 | 2 | 4 |
| Total demerits | 0–100 | 10 | 19 | 26 |
| Score (100-demerits) |  | 90 | 81 | 74 |

The appearance of the cooking water after 20 minutes of cooking was moderately cloudy and had a moderately yellow color. The odor of the cooking water was normal.

TABLE V(a)

The dry product evaluation of Example 8, Table II, (nonfat milk-macaroni—10% nonfat milk solids and 0.1% carrageenan) was as follows:

|  | Range of demerits | Demerits |
|---|---|---|
| Serious flaws: |  |  |
| Checked | 0–20 | 0 |
| Split | 0–10 | 0 |
| Deformed | 0–10 | 0 |
| Color: |  |  |
| Gray or brown (10—very dark) | 0–10 | 0 |
| Yellow (5—no yellow) | 0–5 | 0 |
| Appearance: |  |  |
| Large bubbles (poor predrying) | 0–5 | 0 |
| Small bubbles (poor vacuum) | 0–5 | 0 |
| White specks | 0–5 | 2 |
| Dark specks | 0–5 | 0 |
| Rings | 0–5 | 0 |
| Streaks | 0–10 | 0 |
| Roughness | 0–10 | 0 |
| Total demerits | 0–100 | 2 |
| Score (100-demerits) |  | 98 |

TABLE V(b)

The product evaluation of Example 8, Table II (nonfat milk-macaroni—10% nonfat milk solids and 0.1% carrageenan) after cooking times of 10 minutes, 15 minutes and 20 minutes was as follows:

|  | Range of demerits | Cooking time, minutes | | |
|---|---|---|---|---|
|  |  | 10 | 15 | 20 |
| Gray or brown color (5—very dark) | 0–5 | 0 | 0 | 0 |
| Yellow color (5—no yellow) | 0–5 | 1 | 2 | 2 |
| Surface irregularity | 0–5 | 0 | 0 | 0 |
| Splitting or breaking | 0–10 | 0 | 0 | 0 |
| Stickiness | 0–10 | 0 | 0 | 0 |
| Slime | 0–10 | 1 | 1 | 1 |
| Odor | 0–10 | 0 | 0 | 0 |
| Taste | 0–10 | 0 | 0 | 0 |
| Too soft | 0–10 | 0 | 2 | 2 |
| Too firm | 0–5 | 0 | 0 | 0 |
| Sticks to teeth | 0–10 | 0 | 1 | 1 |
| Doughiness or lack of elasticity | 0–10 | 0 | 1 | 2 |
| Total demerits | 0–100 | 2 | 6 | 8 |
| Score (100-demerits) |  | 98 | 94 | 92 |

The appearance of the cooking water after 20 minutes of cooking was moderately cloudy and it had a moderately yellow color. The odor of the cooking water was normal.

TABLE VI(a)

The dry product evaluation of Example 9, Table II (nonfat milk-macaroni—15% nonfat milk solids and 0.1% carrageenan) was as follows:

|  | Range of demerits | Demerits |
|---|---|---|
| Serious flaws: |  |  |
| Checked | 0–20 | 0 |
| Split | 0–10 | 0 |
| Deformed | 0–10 | 0 |
| Color: |  |  |
| Gray or brown (10—very dark) | 0–10 | 0 |
| Yellow (5—no yellow) | 0–5 | 0 |
| Appearance: |  |  |
| Large bubbles (poor predrying) | 0–5 | 0 |
| Small bubbles (poor vacuum) | 0–5 | 0 |
| White specks | 0–5 | 1 |
| Dark specks | 0–5 | 0 |
| Rings | 0–5 | 0 |
| Streaks | 0–10 | 0 |
| Roughness | 0–10 | 0 |
| Total demerits | 0–100 | 1 |
| Score (100-demerits) |  | 99 |

TABLE VI(b)

The product evaluation of Example 9, Table II (nonfat milk-macaroni—15% nonfat milk solids and 0.1% carrageenan), after cooking times of 10 minutes, 15 minutes and 20 minutes was as follows:

|  | Range of demerits | Cooking time, minutes | | |
|---|---|---|---|---|
|  |  | 10 | 15 | 20 |
| Gray or brown color (5—very dark) | 0–5 | 0 | 0 | 0 |
| Yellow color (5—no yellow) | 0–5 | 1 | 1 | 2 |
| Surface irregularity | 0–5 | 0 | 0 | 0 |
| Splitting or breaking | 0–10 | 0 | 0 | 0 |
| Stickiness | 0–10 | 0 | 0 | 0 |
| Slime | 0–10 | 1 | 2 | 2 |
| Odor | 0–10 | 0 | 0 | 0 |
| Taste | 0–10 | 0 | 0 | 0 |
| Too soft | 0–10 | 0 | 0 | 1 |
| Too firm | 0–5 | 0 | 0 | 0 |
| Sticks to teeth | 0–10 | 0 | 0 | 1 |
| Doughiness or lack of elasticity | 0–10 | 0 | 1 | 2 |
| Total demerits | 0–100 | 2 | 4 | 8 |
| Score (100-demerit) |  | 98 | 96 | 92 |

The appearance of the cooking water after 20 minutes of cooking was slightly cloudy and it had a slightly yellow color. The odor of the cooking water was normal.

In the foregoing preparations, elbow macaroni, the batch sizes and the procedures used, as well as the equipment were the same as previously described. The semolina flour was from a different crop and hence there were slight differences in quality but these differences were judged to be insignificant.

The drying of the macaroni in all of the experiments was carried out under the following conditions:

Preliminary drier:
  95° F. Dry bulb
  85° F. Wet bulb
  (67% R.H.)
  For twenty-five minutes
Sweat period:
  95° F. Dry bulb
  93° F. Wet bulb
  (92% R.H.)
  For one hour
Finish drier:
  95–102° F. Dry bulb
  91–90° F. Wet bulb
  (85%–64% R.H.)
  For eighteen hours The macaroni runs made from each experiment were allowed to age for twelve days before they were cooked. In each case, the finished product was evaluated by the Cooking Test Profile method.

TABLE X.—NUTRITIONAL FACTORS OF MACARONI MADE WITH NONFAT MILK (15%)

|  | 100% semolina mac. (Ex. #14) | Nonfat dry milk | Macaroni made with 15% nonfat dry milk, 0.10% carrageenan (Ex. #18) |
|---|---|---|---|
| Moisture, percent | 10.0 | 3.0 | 10.0 |
| Calories | 366 | 363 | 360 |
| Protein, percent | 12.6 | 35.9 | 15.55 |
| Fat, percent | 1.2 | 0.8 | 1.45 |
| Carbohydrate, percent | 75.5 | 52.3 | 71.2 |
| Ash, percent | 0.7 | 8.0 | 1.63 |
| Calcium, mg./100 g | 27 | 1,308 | 205 |
| Phosphorus, mg | 162 | 1,016 | 279 |
| Iron, mg | 1.3 | 0.6 | 1.2 |
| Sodium, mg | 2 | 532 | 77 |
| Potassium, mg | 197 | 1,745 | 410 |
| Amino acids, percent | | | |
| Cystine | 0.2 | 0.3 | 0.2 |
| Isoleucine | 0.6 | 2.5 | 0.9 |
| Leucine | 1.0 | 4.5 | 1.5 |
| Lysine | 0.5 | 2.7 | 0.8 |
| Methionine | 0.2 | 1.0 | 0.3 |
| Phenylalanine | 0.7 | 2.0 | 0.9 |
| Threonine | 0.4 | 1.7 | 0.6 |
| Tryptophane | 0.2 | 0.5 | 0.3 |
| Valine | 0.6 | 2.6 | 0.9 |

TABLE VII.—ELBOW MACARONI EXPERIMENTS

| Experiment | 14 | 15 | 16 | 17 | 18 |
|---|---|---|---|---|---|
| Semolina, percent | 100.0 | 85.0 | 75.0 | 84.95 | 84.90 |
| Nonfat dry milk | | 15.0 | 25.0 | 15.0 | 15.00 |
| Carrageenan: Iota type | | | | 0.00 | 0.10 |
| Dough water added [1] | 25.8 | 25.1 | 21.2 | 25.1 | 25.10 |
| Condition of macaroni at extrusion | Normal; firm | Normal; firm | Normal; firm | Normal; firm | Normal; firm |
| Condition of the dry macaroni 12 days after drying | Normal | Slightly brittle | Slightly brittle; white surface | Slightly brittle | Normal |
| Condition of cooked macaroni [2] | Normal texture; normal taste | Soft texture; better taste than #14 | Very soft texture; taste equal to #15 | Texture firmer than #15; taste equal to #15 | Texture firmer than #15; taste equal to #17 |
| Average cooking test profile score [3] | 88.6 | 83.3 | 83.1 | 92.3 | 90.5 |

[1] Quantity of water expressed as pounds per 100 lbs. of semolina or semolina dry milk and carrageenan.
[2] Summary of Taste and Texture characteristics taken from composite Cooking Test Profile Scores. (Texture Firmness Rating made at 11 minutes cooking time period.)
[3] Average of Cooking Test Profile Score totals.

TABLE VIII.—ELBOW MACARONI EXPERIMENTS

| Experiment | 19 | 20 |
|---|---|---|
| Semolina, percent | 74.95 | 74.90 |
| Nonfat dry milk | 25.00 | 25.00 |
| Carrageenan: Iota type | 0.05 | 0.10 |
| Dough water added [1] | 21.20 | 21.20 |
| Condition of macaroni at extrusion | Normal; firm | Normal; firm |
| Condition of the dry macaroni 12 days after drying | Slightly brittle; white surface | Slightly brittle; white surface |
| Condition of cooked macaroni [2] | Texture firmer than #16; taste equal to #15 | Texture equal to #19; taste equal to #15 |
| Average cooking test profile score [3] | 86.2 | 85.3 |

[1] Quantity of water expressed as pounds per 100 lbs. of semolina, or semolina and dry milk, or semolina, dry milk and carrageenan.
[2] Summary of Taste and Texture Characteristics taken from composite Cooking Test Profile Scores. (Texture Firmness Rating made at 11 minutes cooking time period.)
[3] Average of Cooking Test Profile Score totals.

The amount of carrageenan employed is subject to variation but should be sufficient to improve the texture stability and cooking stability of the macaroni product.

Taking all of the results shown in Tables I to X together, it is quite evident that by the practice of this invention it is possible to make a new and improved product herein referred to as "nonfat milk macaroni" with as much as 30% of nonfat dry milk. In general, the range of nonfat dry milk is from 1% to 30% and correspondingly the amounts of semolina, durum flour, or any wheat flour is preferably 99% to 70%. Products within this range have a good taste, acceptable texture, and in general are better than standard macaroni. A preferred range of nonfat milk solids is 10% to 20% of the total weight of the macaroni product. Usually the amount of carrageenan is 0.5% to 1% of the weight of the nonfat dry milk.

TABLE IX.—COOKING TEST PROFILE SCORE TOTALS AND AVERAGE
[Elbow Macaroni Experiments (Tables VII and VIII)]

| Ex. No. | Semolina, percent | Nonfat milk, percent | Carrageenan Amt., percent | Carrageenan Type | Cooking Test Profile score 11' | 16' | 21' | Average |
|---|---|---|---|---|---|---|---|---|
| 14 | 100 | | | | 90.0 | 89.5 | 86.5 | 88.6 |
| 15 | 85.0 | 15 | | | 89.0 | 84.0 | 77.0 | 83.3 |
| 16 | 75.0 | 25 | | | 88.5 | 84.5 | 76.5 | 83.1 |
| 17 | 84.95 | 15 | 0.05 | Iota (Gelcarin DG) | 94.0 | 93.5 | 89.5 | 92.3 |
| 18 | 84.90 | 15 | 0.10 | Iota (Gelcarin DG) | 95.0 | 90.5 | 86.0 | 90.5 |
| 19 | 74.95 | 25 | 0.05 | Iota (Gelcarin DG) | 90.5 | 86.5 | 81.5 | 86.2 |
| 20 | 74.90 | 25 | 0.10 | Iota (Gelcarin DG) | 90.5 | 85.0 | 80.5 | 85.3 |

The carrageenan makes it possible to produce macaroni products, including macaroni, spaghetti and vermicelli, having the desired physical properties and taste and containing relatively large quantities of nonfat dry milk. Thus, comparing Example 8 with Example 6 in Table II it will be seen that the physical properties of Example 8 are better than those of Example 6 even though they both contain 10% nonfat dry milk. Similarly, Example 9 is superior to Example 7. Examples 10 to 13 illustrate high nonfat milk macaroni products containing 20–30% nonfat dry milk. Examples 14 to 16 are controls to be used in evaluating Examples 17 to 20. In comparing Example 18, with Example 15, it will be noted that the average Cooking Test Profile score is substantially higher in Example 18, than in Example 15. This difference must be attributed to the presence of the carrageenan since the examples are otherwise essentially the same. It will be recognized that as the quantity of milk solids is increased, it may be desirable to use somewhat greater proportions of carrageenan to obtain optimum results.

The products of the invention can be packaged in dry form and in closed containers with or without liquid or solid flavoring ingredients. Thus, spaghetti made with nonfat milk solids and carrageenan in accordance with the invention can be canned with tomato sauce and/or other ingredients. The invention, therefore, provides new food products having excellent physical and nutritional characteristics which are exceptionally palatable.

What is claimed is:

1. A macaroni product containing less than 0.5% by weight fat, 1% to 30% by weight of nonfat milk solids and a quantity of carrageenan of the Iota type effective to improve the texture stability and cooking stability of said product.

2. A macaroni product containing less than 0.5% by weight fat, 10% to 20% by weight nonfat milk solids and 0.01% to 0.20% by weight carrageenan extract of *Eucheuma spinosum*.

3. Macaroni consisting essentially of a flour from the class consisting of semolina, durum flour, farina and mixtures thereof, 1% to 30% by weight nonfat milk solids, and 0.01% to 0.20% by weight carrageenan extract of *Eucheuma spinosum*.

4. Spaghetti consisting essentially of a flour from the class consisting of semolina, durum flour, farina and mixtures thereof, 1% to 30% by weight nonfat milk solids, and 0.01% to 0.20% by weight carrageenan extract of *Eucheuma spinosum*.

5. Vermicelli consisting essentially of a flour from the class consisting of semolina, durum flour, farina and mixtures thereof, 1% to 30% by weight nonfat milk solids and 0.01% to 0.20% by weight carrageenan extract of *Eucheuma spinosum*.

References Cited

UNITED STATES PATENTS 1,349,524   8/1920   Miner _____ 99—85

OTHER REFERENCES

Glabe et al.: "Cereal Science Today," 1957, vol. 2, pp. 159–162.

Whistler: "Industrial Gums," 1959, Academic Press, New York, pp. 93–95.

RAYMOND N. JONES, Primary Examiner

PO-1050
(5/69)

UNITED STATES PATENT OFFICE
CERTIFICATE OF CORRECTION

Patent No. 3,544,333      Dated December 1, 1970

Inventor(s) Elmer F. Glabe et al

It is certified that error appears in the above-identified patent and that said Letters Patent are hereby corrected as shown below:

Column 4, line 29, "unknowtn" should read -- unknown --; line 41, "doness" should read -- doneness --.

Column 9, line 35, "Stickines" should read -- Stickiness --.

Column 10, Table V (b), opposite "Sticks to teeth", under "15", "1" should read -- 0 --.

Column 12, Table VII, footnote 1, "semolina or" should read -- semolina, or semolina and dry milk, or --.

SIGNED AND SEALED

FEB 23 1971

(SEAL)
Attest:

Edward M. Fletcher, Jr.
Attesting Officer

WILLIAM E. SCHUYLER,
Commissioner of Paten